No. 642,769. Patented Feb. 6, 1900.
K. WESSEL.
GRASS CURLING MACHINE.
(Application filed Oct. 30, 1899.)
(No Model.) 3 Sheets—Sheet 1.

No. 642,769. Patented Feb. 6, 1900.
K. WESSEL.
GRASS CURLING MACHINE.
(Application filed Oct. 30, 1899.)
(No Model.) 3 Sheets—Sheet 2.

Witnesses:
E. F. Wilson
Wm B. Snowhook

Inventor
Karl Wessel
By Rudolph Wm Lotz
Atty.

No. 642,769. Patented Feb. 6, 1900.
K. WESSEL.
GRASS CURLING MACHINE.
(Application filed Oct. 30, 1899.)

(No Model.) 3 Sheets—Sheet 3.

Witnesses:
E. F. Wilson
Wm. B. Snowhook

Inventor:
Karl Wessel
By Rudolph Wm. Lotz
Atty.

UNITED STATES PATENT OFFICE.

KARL WESSEL, OF CHICAGO, ILLINOIS.

GRASS-CURLING MACHINE.

SPECIFICATION forming part of Letters Patent No. 642,769, dated February 6, 1900.

Application filed October 30, 1899. Serial No. 735,192. (No model.)

*To all whom it may concern:*

Be it known that I, KARL WESSEL, a citizen of the United States, residing at Chicago, in the county of Cook and State of Illinois, have invented certain new and useful Improvements in Grass-Curling Machines; and I do hereby declare the following to be a full, clear, and exact description of the invention, such as will enable others skilled in the art to which it appertains to make and use the same.

My invention relates to a novel construction in a grass curling or corrugating machine, the object being to provide a simple and efficient machine of this character in which the grass will be thoroughly carded before passing through the curling or corrugating rollers; and it consists in the features of construction and combinations of parts hereinafter fully described and claimed.

Figure 1:
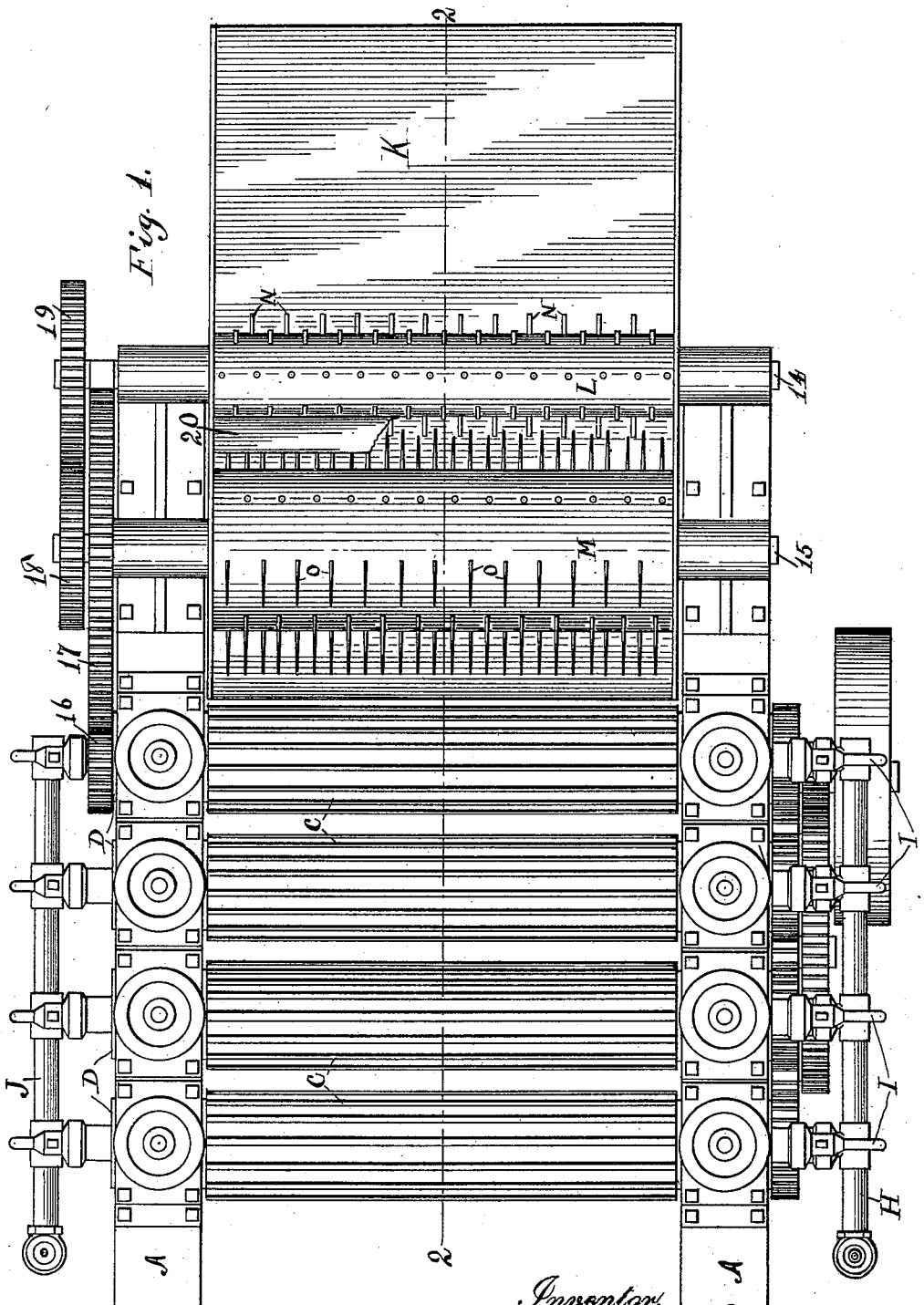
Figure 2:
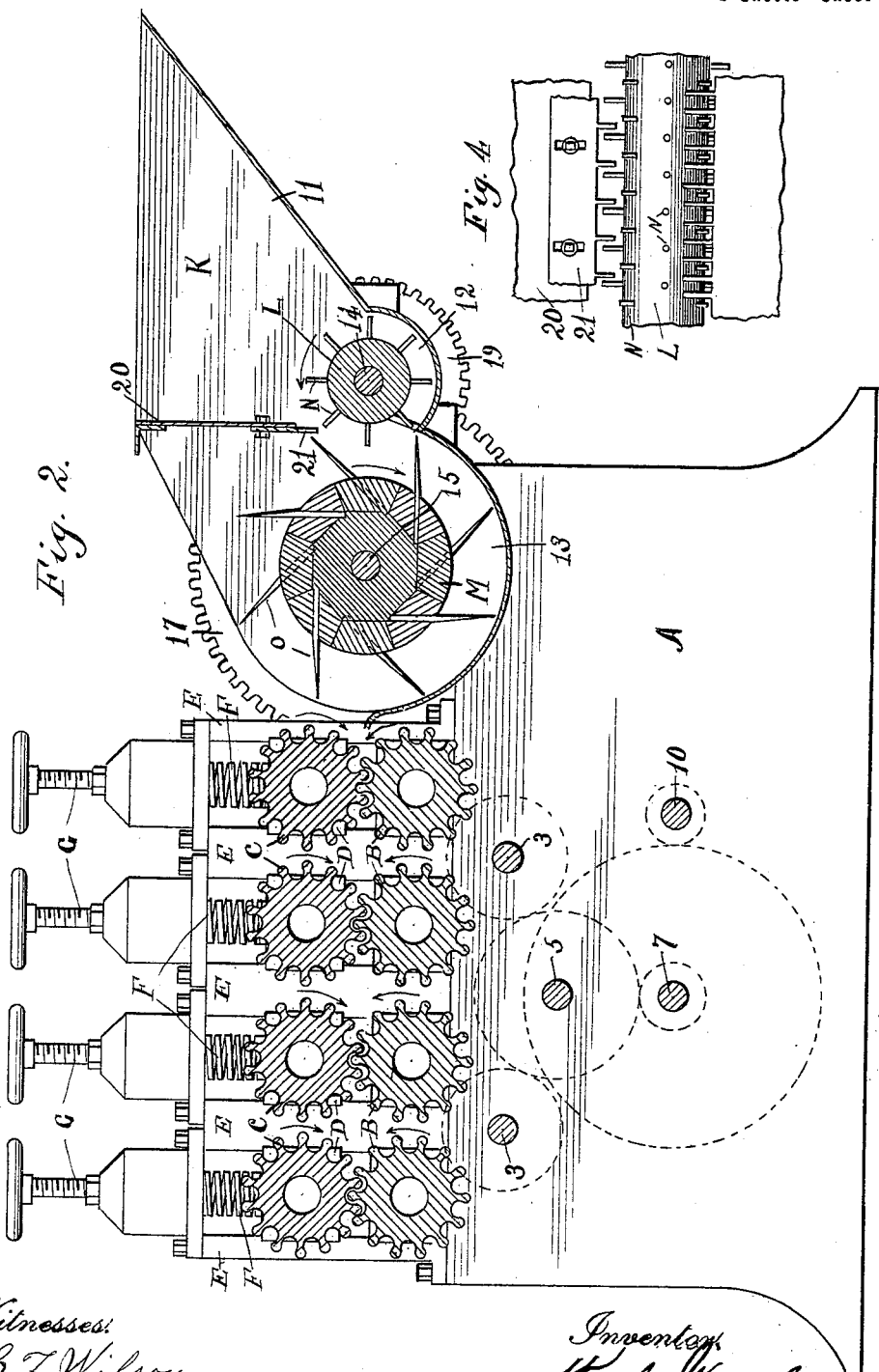
Figure 3:
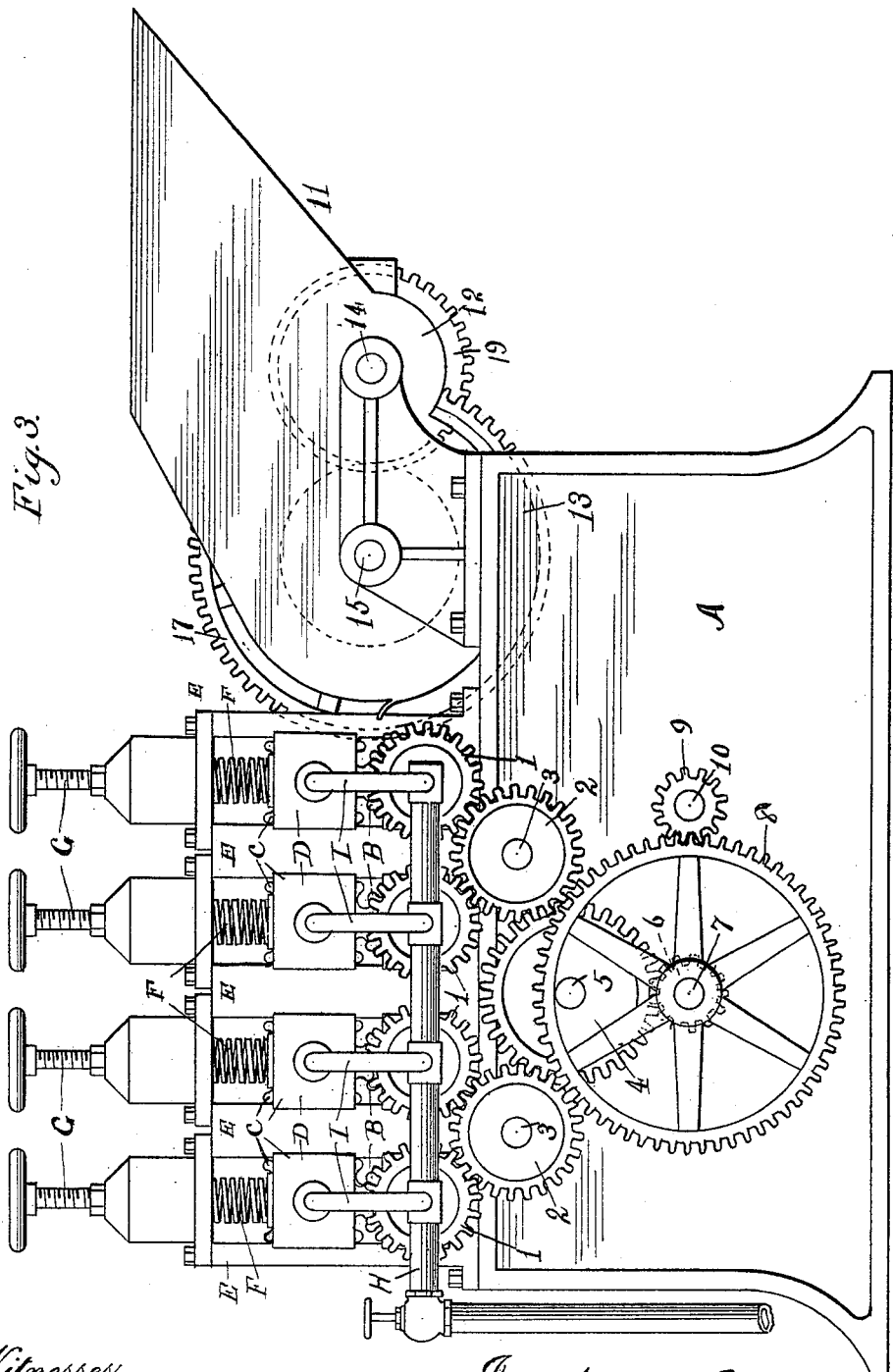

In the accompanying drawings, illustrating my invention, Figure 1 is a top plan view of a grass-curling machine constructed in accordance with my invention. Fig. 2 is a longitudinal section of same on the line 2 2 of Fig. 1. Fig. 3 is a side elevation of the same. Fig. 4 is a detail view showing the stationary comb forming part of the carding devices.

In grass-curling machines heretofore constructed various carding and feeding devices have been employed, but never with the desired success, as the person feeding the machine had to be relied upon to feed the hay or grass in uniform quantities. As a consequence it frequently occurred that at one point a thick bunch of hay or grass was fed and at other points a small quantity. The result was that the thick bunch would force the rollers apart, not only straining same, but likewise preventing them from pressing upon the lesser quantities at other points, so that all of the hay or grass thus passed through was only imperfectly curled or corrugated. Then, again, the carding devices only imperfectly carded the hay or grass, and the latter therefore did not always pass properly through the rollers. To overcome these objections and provide a more efficient machine, I construct same in the following manner:

A indicates the side pieces, forming the frame of my machine, journaled in bearings on which are a plurality of hollow curling or corrugating rollers B, intermeshing with a similar number of rollers C, journaled in sliding bearings D, mounted in vertical guides E and actuated by springs F, the tension of which is adjusted by means of the handscrews G. Said rollers B carry gear-wheels 1 at one of their ends, which intermesh with gear-wheels 2 on shafts 3, journaled in said frame, and these in turn intermesh with a gear-wheel 4 on a shaft 5, which is driven from a pinion 6 on a counter-shaft 7, carrying a large gear-wheel 8, intermeshing with a pinion 9 on the drive-shaft 10. Said rollers B are connected with a steam-supply pipe H by means of stuffing-box connections, and said rollers C are likewise connected with said supply-pipe H by means of flexible tubes I and stuffing-boxes. At their other ends said rollers are similarly connected with an exhaust-pipe J. Upon one end of said frame a sheet-metal receptacle K is mounted, which is provided with a bottom which is inclined at one end, as at 11, and concaved below said inclined portion at two points 12 and 13. Mounted upon shafts 14 and 15, concentric with said concave portions 12 and 13 of said receptacle K, passing through the same and journaled in bearings on said side plates A, are two cylinders L and M, preferably of wood. In said cylinder L I mount short radial pins N, arranged in regular rows, while in said cylinder M the pins O are of greater length and extend outwardly from same in a direction about midway between radial and tangential. The said pins O are so arranged relatively to the cylinder L that the circles described thereby almost touch the said cylinder L and always alternate with the circles described by the pins N. Said shafts 14 and 15 are driven from a gear-wheel 16 on one of said rollers B, which intermeshes with a large gear-wheel 17 on the shaft 15, and the latter carries a small gear-wheel 18, intermeshing with a slightly-larger gear-wheel 19 on the shaft 14. By means of this gearing the cylinder M is driven at less surface speed than said rollers B and at higher surface speed than said cylinder L, the relative surface speed of said cylinders L and M being about one to three. Extending transversely across said receptacle K is a plate 20, which is located in vertical alinement with the space between the cylinders L and M. Said plate 20 carries a comb 21 at its lower end, which is adjustably secured thereto and the teeth of which project below said plate and almost within the paths of the teeth on said cylinders. Said cylinders revolve in opposite directions and as indicated by the arrows. The material to be curled or corrugated is fed upon the inclined portion 11 of said receptacle K and into the path of the teeth on said cylinder L, which obviously catch it and draw it underneath the comb 21, which latter serves to prevent a superfluous quantity from passing through the carding mechanism and between the rollers B and C and at the same time serves as a part of the carding mechanism. When the hay or grass caught upon said cylinder L is brought into the path of the teeth on the cylinder M, the latter, owing to their greater speed, serve to comb the same and cause it to extend transversely to said cylinders and gradually withdraw it from said cylinder L into the concave portion 13 of said receptacle K, where it is continually combed or carded and gradually passed through until the ends thereof are caught between the first pair of rollers B and C. The latter, having greater surface speed than the cylinder M, will withdraw the hay or grass more rapidly than said cylinder M can feed it, and consequently it will be drawn through the spaces between the teeth of said cylinder M as through a comb. Said hay or grass then passes lengthwise between all of said pairs of rollers B and C, where it is curled or corrugated and crushed, so as to be divided into fiber, thus becoming soft, pliable, and elastic and resembling curled hair in its properties.

I claim as my invention—

1. In a grass-curling machine, the combination with curling or corrugating rollers, of carding devices adapted to card the grass, and feed same to said corrugating-rollers, said carding devices comprising a cylinder provided with teeth adapted to primarily engage the grass and draw same into the machine, and a cylinder provided with teeth adapted to pass between the teeth of said first-named cylinder and revolving in an opposite direction and at greater surface speed than said first-named cylinder, adapted to comb the grass held thereon and gradually withdraw the same therefrom and feed it toward said corrugating-rollers, said corrugating-rollers being adapted to revolve at greater speed than said last-named cylinder, whereby the grass, when caught between said corrugating-rollers, is drawn through the teeth on said last-named cylinder as through a comb, substantially as described.

2. In a grass-curling machine, the combination with curling or corrugating rollers, of carding devices adapted to card the grass, and feed same to said corrugating-rollers, said carding devices comprising a cylinder provided with teeth adapted to primarily engage the grass and draw same into the machine, a rigid comb projecting almost into the path of the teeth of said cylinder and adapted to limit the quantity of grass passing through said machine, a second cylinder having teeth adapted to pass between the teeth of said first-named cylinder and adapted to comb the material thereon and gradually withdraw it therefrom and feed it toward said corrugating-rollers, said last-named cylinder being adapted to revolve in the opposite direction from said first-named cylinder and at a surface speed greater than same and less than said corrugating-rollers, whereby the latter are adapted to draw the grass through the teeth on said last-named cylinder as through a comb, substantially as described.

3. In a grass-curling machine, the combination with curling or corrugating rollers, of carding and feeding devices comprising a receptacle to receive grass, a rigid comb extending transversely across the same, cylinders having teeth revolubly mounted in said casing on opposite sides of said comb, one of said cylinders being adapted to primarily engage said hay and draw it into said machine below said stationary comb which is adapted to limit the quantity passing through, and said other cylinder being so located that the teeth thereon pass between the teeth of said first cylinder and are adapted to comb the material thereon and gradually withdraw it therefrom and feed it toward said corrugating-rollers, said last-named cylinder having greater surface speed than said first cylinder and less than said corrugating-rollers, whereby the latter are adapted to draw the grass through the teeth on said last-named cylinder as through a comb, substantially as described.

In testimony whereof I affix my signature in presence of two witnesses.

KARL WESSEL.

Witnesses:
RUDOLPH WM. LOTZ,
E. F. WILSON.